Sept. 10, 1957  M. CICALA  2,805,511
FISHING LURE
Filed Dec. 4, 1956
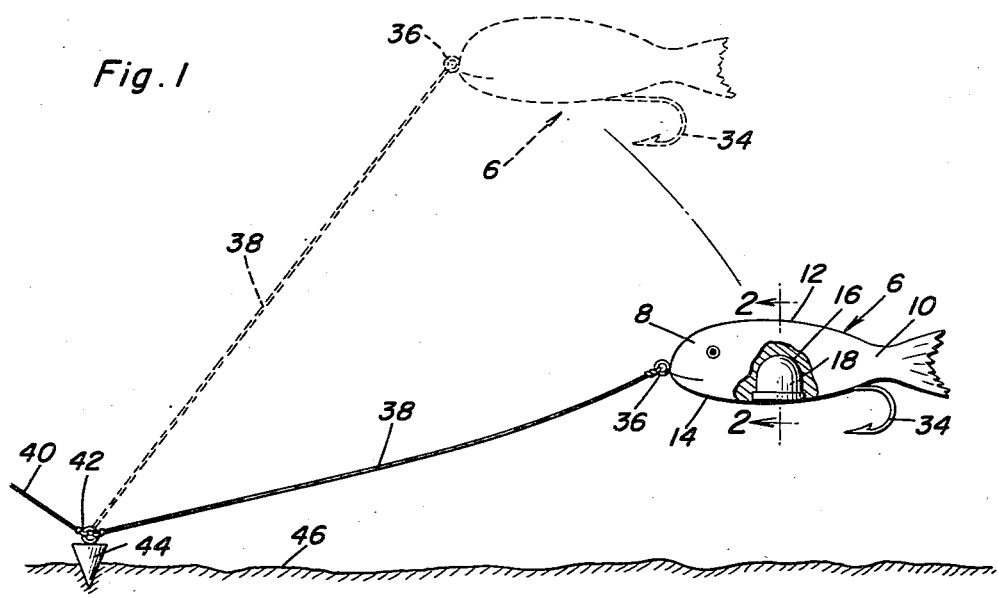
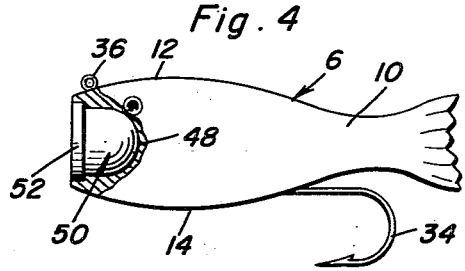
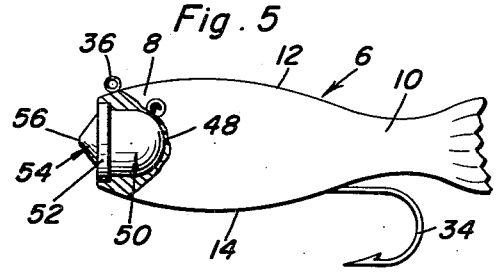
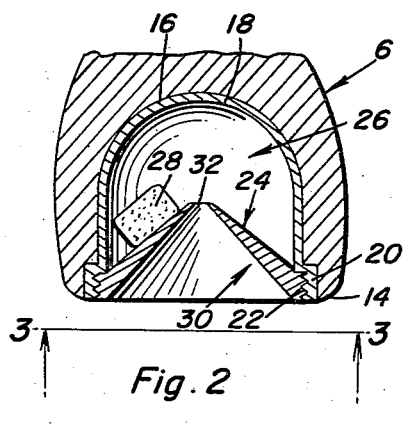
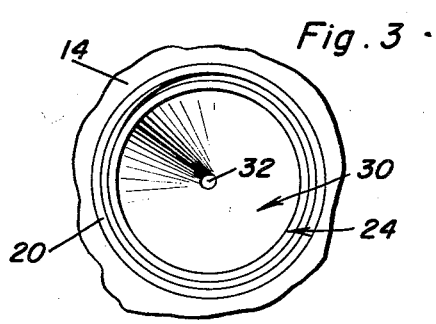
Michael Cicala
INVENTOR.

United States Patent Office 2,805,511
Patented Sept. 10, 1957

2,805,511

FISHING LURE

Michael Cicala, Brooklyn, N. Y.

Application December 4, 1956, Serial No. 626,154

4 Claims. (Cl. 43—42.06)

This invention relates to a novel fishing lure characterized by a hook-equipped plug, which, when in use, represents a given minnow in motion. The plug has a capped, cup-like receptacle therein containing an effervescent tablet or pellet. The tablet is normally inert, but when brought into contact with water, it is activated and intermittently emits gas bubbles in a generally well known manner. In one form of the invention, the receptacle is built into the nose of a buoyant, surface-type plug, and the cap, which is truncated conical in form, is applied to protrude or, alternatively, to telescope and recede into the chamber portion of the receptacle. While the plug is being trolled or otherwise maneuvered by the fishing line, a stream of gas bubbles is emitted through the orifice of the cap. The life-like illusion which is thus brought about will lure a victim fish and render the plug effective in making the intended catch.

In another form or adaptation, the capped cup or receptacle is built into the median area of the ventral side of the plug, with the truncated end of the conical cap turned inwardly into the chamber of the cup. In this embodiment the cap itself becomes an outer chamber. The gas bubbles emitted from the inner chamber are progressively trapped, and when concentrated, build up pressure sufficient to displace water from said outer chamber. As a result, the buoyancy of the plug increases and the plug ascends in the body of water. When the accumulated and concentrated gas pressure is dissipated and reduced sufficiently the plug descends or sinks. With the aid of a sinker on the line and with the sinker resting on the water's bottom, repeated cycles of operation and the rising, falling and swimming motions make it possible to utilize the art of deception to its fullest advantage in attracting fish.

Other interpretations not comprehended above may well become apparent from the specification and the invention as claimed.

In the drawing:

Fig. 1 is a view in section and also in elevation illustrating one embodiment of the invention and how it is intended to function;

Fig. 2 is an enlarged fragmentary cross section on the line 2—2 of Fig. 1;

Fig. 3 is a fragmentary bottom plan view taken on the plane of the line 3—3 of Fig. 2;

Fig. 4 is a side elevation with a portion broken away and shown in section of a second embodiment of the invention; and Fig. 5 is a similar view showing a third embodiment of the invention.

Attention is first invited to Figs. 1 to 3, inclusive. In Fig. 1 the lure is denoted generally by the numeral 6 and comprises a wooden or an equivalent buoyant plug in representation of a minnow. The forward or head end is denoted at 8, the rearward or tail end at 10, the dorsal side at 12, and the ventral side at 14. The median or central portion of the ventral side is provided with a recess or cavity 16 in which a cup-like, hollow shell or receptacle of imperforate form, at 18, is mounted. The open side of this, as shown in Fig. 2, is substantially flush with the ventral side. It is slightly enlarged in diameter at this point and formed into an endless, internally screw threaded rim 20. This serves to accommodate a screw threaded peripheral or rim portion 22 on what may be called the basal portion of a truncated conical cone 24. The cone serves as a cap or closure and defines an inner chamber 26 containing an effervescent pellet or tablet 28, which, when wet, serves to generate gas bubbles. The tablet may be composed of water soluble tartaric acid and sodium bicarbonate. It will be noted that the cap 24 also provides a conical receptacle which may be referred to as an outer chamber 30. The cap telescopes into the chamber 26, with the orifice 32 located in the manner shown in Fig. 2. The plug is provided on its bottom or ventral side with a suitable fish hook 34 and the nose is provided with an eye 36 to which the lower end portion 38 of the fishing line 40 is connected. Fixed as at 42 to the line and spaced upwardly or forwardly of the plug is a sinker. As before mentioned, this is intended to rest on the bottom 46 of the water, enabling the combination to serve in the manner shown in full and phantom lines in Fig. 1.

It will be evident that with the capped cup or receptacle built into the bottom of a balanced lure (just so weighted that it is just a trifle heavier than the water it displaces in order to cause it to sink in the intended manner) and then loaded with the effervescent pellet and with the cap in place, the outer chamber 30 thereof will accumulate bubbles. The concentration and accumulation of bubbles serves to render the lure lighter than the water it displaces. In so doing, the lure will rise as high as desired, depending on the position of the sinker on the line. At its thus restricted height, the lure will become heavier than the water which it displaces and will sink again. This repeated cycle of operation will continue until the tablet has been completely dissolved, necessitating, of course, reloading the chamber 26 by removing and replacing the cap 24.

In Figs. 4 and 5 the lure proper is the same in construction as the lure seen in Fig. 1. Therefore, and for simplification, the same numerals aupply to corresponding or like parts throughout all views. In this arrangement, however, the recess or cavity, instead of being in the ventral side, is formed in the nose or head 8 and is denoted by the numeral 48. The cup-like receptacle or shell 50 is likewise mounted in this cavity as shown. The internally screw threaded rim 52 serves to accommodate the attachable and detachable truncated conical cap 54 which is the same in construction as the one shown specifically in Fig. 2. As a matter of fact, in Fig. 4 the cap is applied in the same way as seen in Fig. 2 (not detailed). However, in Fig. 5, the cap is reversed, the screw threads being arranged accordingly. That is to say, the cap now has its truncated end 56 protruding or projecting and representing the nose of the plug. These two forms of the invention are intended primarily, but not necessarily, for surface use, and the plugs are constructed with the requisite degree of buoyancy. In Fig. 5 the gas bubbles are concentrated in the chamber portion of the cap and are emitted through the orifice 56, and the stream of bubbles serves to attract the fish in an obvious manner. The same general principle of operation applies to Fig. 4, except that here the cap functions to a limited extent as does the cap 30 in Fig. 2, resulting not only in the intermittent emitting of gas bubbles, but also a more activated motion for the over-all plug.

As is evident, the lure, although described as a minnow may, obviously, be of any suitable shape and in representation of any number of baits.

What is claimed as new is as follows:

1. A fishing lure comprising a hook-equipped plug having an imperforate cup-like receptacle defining a chamber adapted to contain an effervescent substance capable of emitting gas upon contact with water entering said chamber when said plug is submerged in a body of water, the open side of said receptacle being flush with and opening through a surface of said plug, a recessed cap removably attached to the open side of said receptacle and provided centrally with a restricted orifice.

2. The structure defined in claim 1 and wherein said cap comprises a truncated cone, said cap having screw threaded rim and said receptacle also having a screw threaded rim, and said cap being capable of being mounted so that the truncated end may be caused to telescope into the chamber portion of the receptacle or may be reversed and mounted so that the essential portion thereof projects beyond the adjacent surfaces of said plug.

3. The structure defined in claim 1, and wherein said capped receptacle is mounted on the ventral side of the plug midway between the forward and rearward ends and lengthwise sides, a fishing line attached to the forward end of said plug, and a sinker attached adjustably to said line in advance of said plug.

4. For use on a fishing lure, a cup-like receptacle having a screw threaded rim surrounding its open side, and a truncated conical cap, the basal portion of which has a screw threaded rim screwed into said first named rim and serving as a closure, whereby a water soluble gas generating pellet may be placed and confined for operation in the receptacle portion of said cap.

References Cited in the file of this patent

UNITED STATES PATENTS

| | | |
|---|---|---|
| 1,961,539 | White | June 5, 1934 |
| 2,415,742 | Hiltabidel | Feb. 11, 1947 |